Inventor:
Winslow L. Hurford,
by Merton D. Moore
His Attorney.

March 5, 1957 W. L. HURFORD 2,784,246

ELECTRICAL SYSTEM

Filed April 10, 1951

3 Sheets-Sheet 2

Inventor:
Winslow L. Hurford,
by Merton D. Moore
His Attorney.

Inventor:
Winslow L. Hurford,
by Meslow D. Morse
His Attorney.

2,784,246

ELECTRICAL SYSTEM

Winslow L. Hurford, North Syracuse, N. Y., assignor to General Electric Company, a corporation of New York Application April 10, 1951, Serial No. 220,244

5 Claims. (Cl. 178—5.8)

Figure 1:
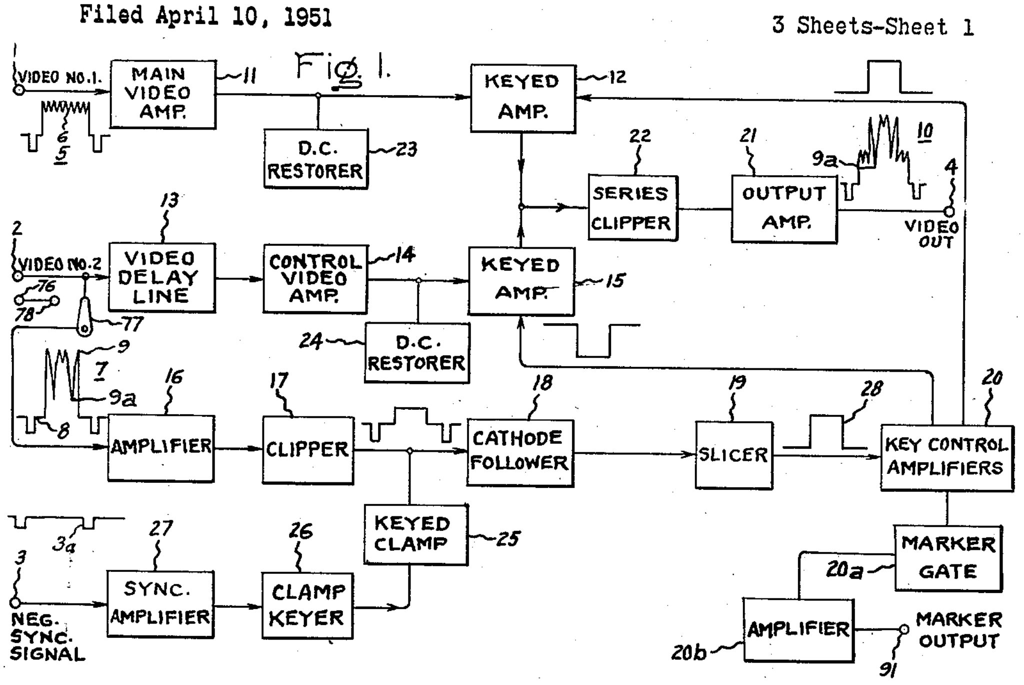

My invention relates in general to circuits for controlling the transmission of electrical signals and relates in particular to means in a television system for deriving a combined picture from two or more scenes and to means in a television system for changing in any desired manner the picture transmission from one picture to another.

The invention has particular application, for example, when it is desired to superimpose advertising matter on the main scene on a television screen. The main scene may be scanned by one television camera line by line, to obtain a first video signal. The advertising matter is scanned by another camera to obtain a second video signal. The latter signal comprises video lines having a generally prominent portion extending into the white region of the television signal. The invention makes use of the prominent portion of the video signal of each video line of the second video signal to develop control potentials which are used to block the passage of the first video signal to the utilization circuits and permit passage of the prominent portion of the second signal during the occurrence of the prominent portion of the second video signal to obtain thereby a combination picture having the main scene as background and the advertising matter displacing a portion of the background scene. Combination pictures of the kind made up of two or more pictures or scenes are known in the art as photo montages.

Accordingly, it is an object of my invention to provide means for deriving a combination video signal adapted to produce a combination television picture from two or more video signals representing different scenes.

Another object of my invention is to provide means for indicating on a view finder of the camera televising the auxiliary scene, the particular portion of the auxiliary scene being used in the photo montage.

Still another object of my invention is to provide commercially acceptable and workable circuits for the production of photo montage effects.

A further object of my invention is to provide apparatus for electronically changing the gain of one video channel in response to the signal level in another video channel so that the signal from the second or controlling channel may be superimposed upon that of the first or control channel in the areas where the gain of the first channel has been reduced appreciably to zero in response to the signal level of the second controlling channel to produce a subjective effect which is analogous to that of a photo montage.

An important feature of my invention is the provision of an improved combination of circuits simple in construction while at the same time reliable, efficient and effective in operation to perform their desired functions of synthesizing video signals into a combination video signal that is free of extraneous switching transients and other undesired effects produced by the synthesizing operation.

A general object of my invention is to provide improvements in signal transmission circuits particularly directed to controlling the signal transmission whereby, for example, special "wipe" dissolve effects may be produced of the kind where one picture is wiped off a television screen and another is simultaneously unfolded in its place on the screen.

In one embodiment of my invention, I provide a pair of electron discharge devices having a common output circuit and each having input circuits, one of which is adapted to be supplied with a first video signal and the other of which is adapted to be supplied with a second video signal, the latter video signal comprising lines including a prominent portion. In addition, I provide a circuit for deriving a square wave signal from the prominent portion of the second video signal. I also provide another circuit for applying the square wave signal to one of the electron discharge devices and for applying a second square wave signal of opposite polarity to the other of the electron discharge devices so that the electron discharge device to which the first video signal is applied is rendered non-conductive while the electron discharge device to which the second video signal is applied is rendered conductive and vice versa. The net result obtained from the foregoing circuit is a combination video signal made up of part of the main video signal and part of the second video signal. The combination video signal will produce a combination picture having a portion of the main scene displaced by a portion of the second scene.

Figure 3A:
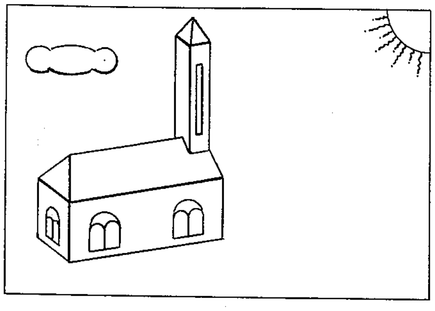
Figure 3B:
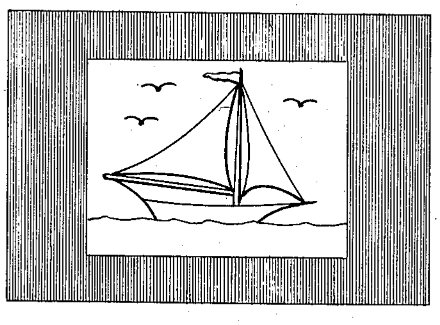
Figure 3C:
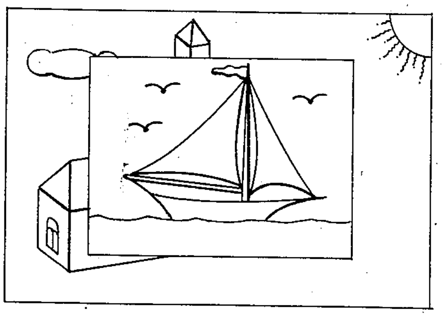
Figure 2:
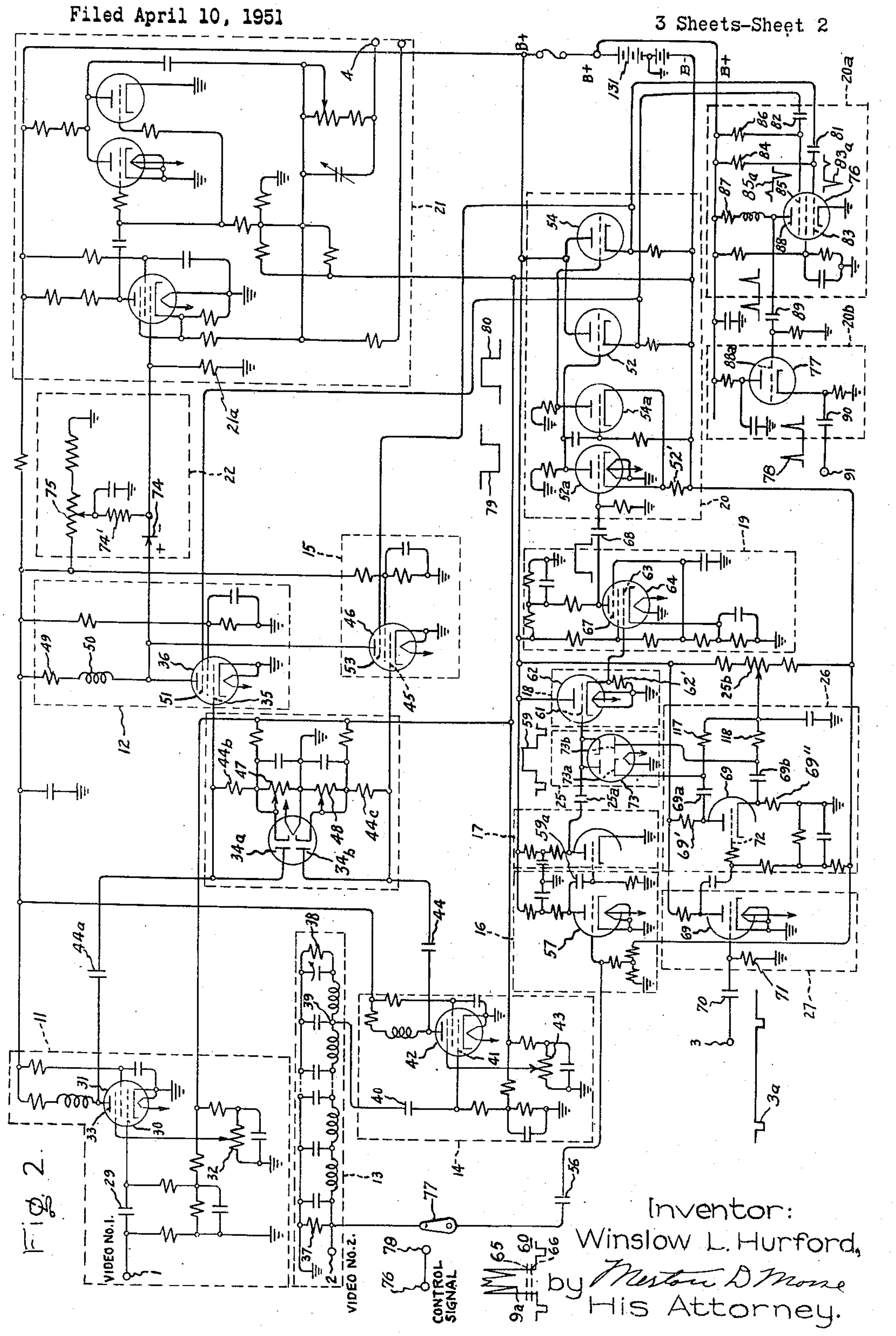
Figures 4, 5:
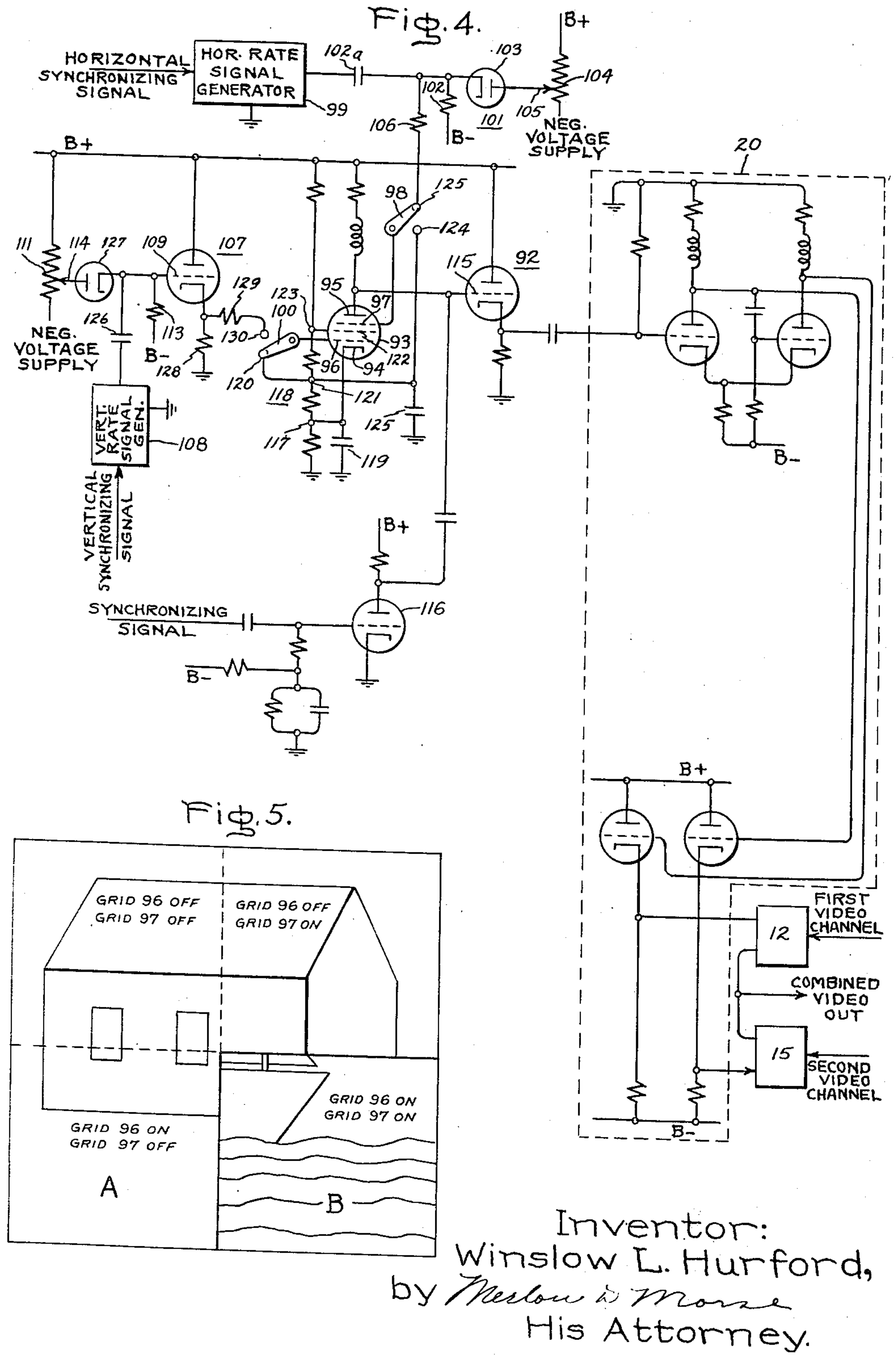

The novel features which are believed to be characteristic of my invention are set forth with particularity in the appended claims. My invention, however, both as to its organization and method of operation, together with further objects and advantages thereof may best be understood by reference to the following description taken in connection with the accompanying drawings in which Fig. 1 is a block diagram of an embodiment of my invention, Fig. 2 is a schematic diagram of the embodiment of my invention shown in block diagram form in Fig. 1; Figs 3*a* and 3*b* represent different subjects adapted to be televised; Fig. 3*c* represents the combination picture or photo montage that may be produced by means of the invention. Fig. 4 represents a schematic diagram of an embodiment of my invention for producing wipe dissolve effects; Fig. 5 shows the manner in which a particular kind of wipe dissolve effect called a wedge wipe may be obtained by means of the circuits of Fig. 4.

Referring now to the block diagram of Fig. 1, terminals 1, 2 and 3 are provided for the application of a first video signal, a second video signal and a negative synchronizing signal, respectively, to the system and a terminal 4 is provided for obtaining a combination video signal from the system. Adjacent terminals 1, 2 and 4 are illustrated graphs representative of signals appearing on the respective conductors. The graph 5 adjacent terminal 1 represents the signal produced during scanning of a single line of the first scene to be transmitted. This signal is shown as applied to terminal 1. The shade represented by the level 6 of the graph 5 is a shade between black and white.

The graph 7 adjacent terminal 2 represents the signal produced during scanning of a single line of the second scene to be transmitted. This signal is shown as applied to terminal 2. This second video signal has a black portion represented by the level 8 and a white portion represented by the level 9 in the graph 7. The second video signal may have spike-shaped voltage pulses 9*a* as shown depending on the composition of the second scene.

The graph 3*a* adjacent terminal 3 represents a line of the synchronizing signal applied to terminal 3.

The graph 10 adjacent output terminal 4 represents the combination video signal and comprises a line of the first video signal into which is inserted a complementary portion of a line of the second video signal. By combining the video signals in this way line by line, the resultant video signal is adapted to produce at the receiver screen a picture in which the video signal from a first source constitutes the background scene and the video signal from a second source constitutes an inset scene displacing the corresponding portion of the main scene to produce a photo montage effect.

Referring now to the operation of the circuit of Fig. 1, a video signal from the main scene is applied through a video amplifier 11 to the input circuit of the keyed amplifier 12. The video signal from the second scene is applied through a delay line 13, whose function will be more fully pointed out below, and a control video amplifier 14 to the input circuit of a second keyed amplifier 15. The amplifiers 12 and 15 are arranged so that they supply signals to a common load or utilization circuit.

The amplifiers 12 and 15 are further arranged so that only one of the amplifiers is conducting at a time. This latter function is achieved by supplying pulses of opposite polarity to key one amplifier on while the other amplifier is keyed off and vice versa. The amplifier 12 is keyed off in response to control pulses derived from prominent portions of the video signal from the second source of video signal through an amplifier 16, a clipper or wave forming circuit 17, a cathode follower 18, a slicer or wave forming circuit 19 and key control amplifiers 20. The latter channel which may be called the control channel functions to develop a square wave from the second video signal properly to key the amplifiers 12 and 15 to effect the synthesis of the first and second video signals.

The combination video signal is supplied through an output amplifier 21 to an output terminal 4.

With reference to the manner of developing the control signal for keying amplifiers 12 and 15, the second video signal is first applied to amplifier 16. Clipper 17 clips off or removes the top portion of the video signal obtained from amplifier 16. The signal is then applied to a cathode follower 18 which provides a low driving impedance for the slicer 19. The slicer 19 is a circuit developing no control potential while the signal level is below a certain level and developing full output potential when the signal level is slightly above the aforementioned level. The key control amplifiers 20 constitute convenient means for applying signals of opposite polarity to the keyed amplifiers 12 and 15.

The rectangle 20*a* on the diagram, having the legend "marker gate" represents apparatus which functions to develop a pair of short pulses of horizontal line frequency corresponding to the leading and lagging edges of the control pulse which appears at the output of the slicer 19, and which is represented by the graph 28. These short pulses are applied through amplifier 20*b* and terminal 91 to a camera viewfinder which may monitor the second scene. The short pulses for each video line form in the aggregate an indication on the viewfinder in the form of a dark or light line depending on the polarity of the short pulses enclosing the portion of the second scene being inserted in the combination picture.

The rectangles 23 and 24 on the diagram represent D. C. restorers, which substantially restore the unidirectional component of the first and second video signals, respectively, which components are lost in passing these video signals through video amplifiers 11 and 14. The keyed clamp 25, clamp keyed 26 and synchronizing amplifier 27 in the aggregate function suitably to clamp or adjust the unidirection reference level of the signal obtained from the clipper 17 with respect to ground so that the cathode follower 18 can properly drive the slicer 19 to produce consistently the essentially square waveform represented by graph 28.

The function of the delay line 13 is to provide a delay in the second video signal to compensate for the delay introduced in a production of the control pulse in the control channel.

Referring now to Fig. 2 there is shown a schematic diagram of the embodiment of my invention shown in block form in Fig. 1. The dotted line rectangles represent apparatus represented in Fig. 1 by full line rectangles bearing the same reference numerals.

The video channel 11 and 12 is shown at the top of the drawing and immediately below it is shown the video channel 13, 14, 15. The outputs of these two channels are shown combined at the anodes of the two discharge devices 51 and 53 in rectangles 12 and 15 which anodes are shown connected directly together. These anodes are then shown connected through the common output circuit 22, 21 to the output load circuit 4. The control channel is shown in the lower portion of the drawing.

At the right of the drawing is shown a source of operating potential 131 having a positive terminal B+, a negative terminal B— and an intermediate point which is grounded. The source serves to supply operating potential to all the discharge devices requiring static operating potential. The positive terminal B+ is connected through respective load resistors to the anodes of all such discharge devices except the cathode followers 62, 52 and 54 anodes of which are connected directly to the terminal B+, and except amplifiers 52*a* and 54*a* the anodes of which are connected through respective load resistors to ground. The cathode of cathode follower 62 is connected through load resistor 62′ to ground and the cathodes of cathode follower 52 and 54 are connected to the terminal B— through respective load resistors, and the cathodes of device 52*a* and 54*a* are connected through biasing resistor 52 to the terminal B′. The cathodes of all other devices energized from source 131 are connected to ground either directly or through biasing resistors.

The main video signal, the instantaneous magnitude of which varies as shown by the graph 6 in Fig. 1, is applied at terminal 1 and passes through coupling condenser 29 to the grid 30 of electron discharge device 31, which forms a part of the video amplifier 11. Potentiometer 32 connected between the terminal B— and ground, has a variable contact connected to supply bias potential to the suppressor grid of device 31 for varying the gain of the amplifier 11. The output from the plate 33 of the video amplifier 11 is applied through coupling capacitor 44*a* to control grid 35 of device 36.

The second video signal is applied to a delay line 13, which is properly terminated by impedance 37 for the transmission line supplying the delay line and it is also properly terminated by impedance 38 to substantially eliminate reflections anywhere in the transmission system. By making the characteristic impedance of the delay line relatively large with respect to the characteristic impedance of the line feeding the delay line, for example, the order of 10 to 1, satisfactory operation with tolerable reflections is obtained.

The second video signal after being delayed by the delay line 13 is coupled from a suitable point 39 through coupling condenser 40 to the grid 41 of control video amplifier 14 comprising electron discharge device 42. Potentiometer 43 is connected to supply bias potentials to a grid of device 42 for varying the gain of video amplifier 14. The output from the video amplifier 14 is coupled through a coupling condenser 44 to the grid 45 of an electron discharge device 46 functioning as keyed amplifier 15.

The first video signal loses its unidirectional component in passing through amplifier 11; accordingly, a circuit comprising capacitor 44*a* in series with the shunt combination of resistance 44*b* and one unilaterally conducting device 34*a* is provided to restore the unidirectional component. The positive pole of the device 34*a* is connected to the junction of resistance 44*b* and capacitor 44*a*. The negative pole of the device 34*a* is connected to the other end of resistance 44*b* and to a variable contact on voltage divider 47 which is connected between ground and a B— point. The time constant of the combination of resistance **44*b* and capacitor 44*a*** is made relatively long in comparison to the duration of time between periodically recurring portions of the video signal.

In operation, the voltage developed across capacitor **44*a* corresponds to the maximum peak to peak voltage of the applied video signal. The side of capacitor 44*a* connected to the positive pole of device 34*a* becomes negative with respect to the other side of capacitor 44*a* since unit-laterally conducting device 34*a* permits flow of electrons to this point but not from it. After the occurrence of a peak in the applied video signal the capacitor 44*a* tends to discharge slightly through resistance 44*b*. However, since the time constant of the combination of resistance 44*b* and capacitor 44*a* is relatively long in comparison to the time between successively recurring peaks, the capacitor 44*b* loses only a small portion of its charge through resistance 44*b* and, of course, it loses none of its charge through device 34*a*. The charge which capacitor 44*a* loses between successively recurring peaks of signal is replenished by the subsequent one of the peaks in the manner explained above. Thus, a unidirectional voltage is caused to exist across capacitor 44*a* which is added to the signal from the output circuit of the preceding amplifier 11. The amount of the unidirectional component appearing across capacitor 44*a* may be varied by varying the variable contact on voltage divider 47**.

The impedance comprising resistance 49 and inductance 50 comprises a common plate load for the keyed amplifiers 12 and 15. Electron discharge devices 36 and 46, though not limited to a particular type, are preferably type 6AS6's which permit suppressor grid control of their conduction.

The suppressor grid 51 of keyed amplifier 12 is connected to a first key control electron discharge device 52 adapted to supply pulses of one polarity to the suppressor grid. The suppressor grid 53 of keyed amplifier 15 is connected to a second electron discharge device 54 adapted to supply pulses to suppressor grid 53 of a polarity opposite that supplied to the suppressor grid 51. The grids of electron discharge devices 52 and 54 are connected to the plates of electron discharge devices **52*a* and 54*a*. Devices 52, 52*a*, 54 and 54*a* comprise the key control amplifier 20** of the control channel of the circuit of Fig. 2.

The control channel comprises amplifier 16, clipper 17, cathode follower 18, slicer 19 and key control amplifiers 20 all represented by dotted boxes in Fig. 2. The grid of tube 57 of amplifier 16 is connected through coupling capacitor 56 and switch 77 to terminal 2 to which a video signal is applied as pointed out above. The plate, or anode, of amplifier tube 57 is connected through coupling capacitor **59*a* to the grid of clipper 17. The anode of clipper 17 is connected through capacitor 25*a* to grid 61 of cathode follower tube 62. The cathode of tube 62 is conductively connected to grid 63 of tube 67 which is an element of slicer 19. The anode of tube 67 is connected through coupling capacitor 68 to the grid of tube 52*a* of keying amplifiers 20**.

With reference to the manner in which the keying square wave signals are developed by the above-described control channel consider a video signal the instantaneous variations of which are represented by the graph 60, applied to the control channel through switch 77. This video signal is applied through coupling condenser 56 to the grid of amplifier 16, the output of which is coupled to clipper or waveforming stage 17 which develops at its output the waveform represented by graph 59, i. e. the top portion of waveform 60 is removed. The high intensity portion of the signal 60 applied through amplifier 57 to the grid of stage 17 drives the grid negative, since its polarity is reversed by amplifier 57, rendering the stage nonconducted during the occurrence of the high intensity portion of the signal thereby developing the signal 59. The signal 59 from the wave forming stage 17 is applied to the grid 61 of cathode follower 18 comprising electron discharge device 62. The output of the cathode circuit of the electron discharge device 62 is applied to the grid 63 of electron discharge device 64 of slicer 19. The tube 64 develops a square waveform from a portion of the signal 60 included between lines 65 and 66 on waveform 60.

Device 64 is preferably a type 6BN6 gated beam electron discharge device. A unidirectional potential is applied to the second grid 67 of the device 64. The device 64 has the characteristic of permitting conduction only when proper potentials are applied to both grids 63 and 67; that is, both grids have absolute control over conduction through the device. It has the further characteristic that once conduction is established a small increase in either grid potential will cause conduction to reach its maximum value. By suitably biasing the second control grid 67, the device 64 can be made to conduct when the signal level applied to the first control grid 63 exceeds a level corresponding to line 66 on waveform 60. Since the device has the further characteristic that a slight increase in potential corresponding to level 65 saturates the device, a square wave pulse is produced from a small segment of the high intensity portion of the second video signal.

The slicer 19 could be any device which produces a substantially constant output signal as long as the input signal slightly exceeds a given triggering level and producing no output when the input signal drops below the given triggering level. The conduction level is chosen as near to the base line of the signal or a line which corresponds to black in the signal, as is practical for obtaining a clean control signal free from spike-shaped voltage pulses illustrated as **9*a* on graph 60. The output of the slicer 19 is applied through a coupling condenser 68 to the key control amplifiers 20**.

From the plate of device **52*a* pulses of one polarity are applied to the grid of device 52 and from the plate of device 54*a*, whose grid is connected to the plate of device 52*a*, pulses of opposite polarity are applied to the grid of device 54. From the cathodes of devices 52 and 54 pulses of opposite polarity as shown in graphs 80 and 79 are obtained for keying amplifiers 12 and 15** in a manner described above.

Of course, the direct curent component of the signal transmitted through amplifiers 16 and 17 is removed by condensers **59*a* and 25*a*. To restore this D.-C. component, the channel comprising electron discharge devices 69 and 73 is provided. The device 69 is a two stage amplifier having the synchronizing signal applied between the input grid and cathode of the first stage and having output taken from the second stage. The resistors 69′ and 69″ are connected respectively between the anode of device 69 and the B+ terminal and between the cathode of device 69 and ground so that signal variations occur on both the anode and cathode with equal intensity and opposite polarity. The signal variations on the output anode of device 69 are supplied through capacitor 69*a* to the cathode 73*a* of a diode, the anode of which is connected to grid 61, and the signal variations on the output cathode of device 69 are supplied through capacitor 69*b* to the anode 73*b* of a diode, the cathode of which is connected to the grid 61. The cathode 73*a* and the anode 73*b* are connected through resistances 117 and 118, respectively, to movable contact of potential divider 25*b* which is connected between ground and a B— point. The movable contact of divider 25*b*** may be by-passed to ground through a capacitor.

In operation, a negative synchronizing signal represented by graph **3*a* is applied between terminal 3 and ground between which is also connected a differentiating network comprising capacitor 70 and resistance 71**. Short pulses corresponding to the leading and lagging edges of pulses of the synchronizing signal 3a are developed across the resistance 71 and are applied to the input grid of device 69. The short differentiated pulses are amplified by device 69 and applied to grid 72. The short pulses corresponding to the leading edge of the synchronizing pulses being of positive polarity are clipped or removed since the grid and cathode of second stage of device 69 have the same quiescent potential while the pulses corresponding to the trailing edge are amplified and applied to the diode in the manner explained above. Since a negative pulse is applied to cathode 73 and a positive pulse is applied to anode 73b, device 73 becomes conductive permitting current to flow in either direction between capacitor 25a and the movable contact arm of voltage divider 25b. The aforementioned pulses occur during the blanking interval of the second video signal appearing in the control channel; accordingly, the voltage developed across the capacitor 25a is determined by the magnitude of the blanking voltage and the potential of the movable contact arm of voltage divider 25b. After the occurrence of the aforementioned pulses the diode 73 becomes nonconductive due to positive and negative voltages appearing across resistances 117 and 18, respectively, caused by the discharging of capacitors 69a and 69b which become charged during the application of the aforementioned pulses. Thus, a unidirectional component of voltage depending on the magnitude of the blanking pulse and the setting of voltage divider 25b appears across capacitor 25a and is added to the signal from the output of amplifier 17. For further details as to operation of the keyed clamp and the clamp keyer reference should be made to United States Patents Nos. 2,299,945 and 2,313,906 and to an article in the RCA Review of March 1948 by Mr. K. R. Wendt.

Whenever the keyed video amplifiers 12 and 15 are switched from a conductive to a nonconductive state or vice versa, spike-shaped voltage pulses are produced in the output circuit of the keyed amplifiers 12 and 15. This voltage is supplied through a unidirectional conducting device 74, which may be a diode, to the grid of subsequent amplifier 21. Device 74 has its anode connected to the anodes of amplifiers 12 and 15 and its cathode connected through grid resistance 21a to ground. This cathode is also connected through resistance 74′ to a variable contact on potentiometer 75 which is connected across the power supply. Potentiometer 75 thus establishes a fixed voltage on the cathode of device 74 rendering that device nonconductive when the anode becomes less positive than its cathode. Accordingly, since the spike-shaped voltage pulses drop the potential of the anodes of devices 36 and 46 to values at which device 74 is non-conductive, the spike-shaped voltage pulses are eliminated from the signal passed through the clipper 22. The output from the video amplifiers 36 and 46 and clipper 22 is applied to a video amplifier 21 which functions as an impedance adjusting stage from which the video signal is applied to the output terminal 4.

The circuit comprising electron discharge devices 76 and 77 functions to develop a pair of short pulses 78 of the same polarity and of horizontal line frequency corresponding to the leading and lagging edges of control pulses 79 and 80. When these short pulses are applied from terminal 91 to a camera viewfinder monitoring the second scene, an indication in the form of either a dark or light line marking off the portion on the second scene being inserted in the combination picture appears thereon. This assists the camera operator in keeping the portion of the second scene which it is desired to transmit properly located.

Referring now to circuit detail, control pulses 79 and 80 are applied to the grids 83 and 85, respectively, of electron discharge device 76 through capacitors 81 and 82, respectively. Grid 83 of electron discharge device 76 is connected through resistance 84 to the positive terminal B+ of the source of operating potential. Grid 85 of electron discharge device 76 is similarly connected through resistance 86. Since each of the grids of electron discharge device 76 which preferably is a type 6BN6 electron discharge device is connected to B+ potentials, device 76 normally passes a large current which develops a large voltage drop across plate impedance 87, one end of which is connected to a source of B+ potential, the other end of which is connected to plate 88 of electron discharge device 76.

The networks comprising capacitor 81 and resistance 84, and capacitor 82 and resistance 86, respectively, operate as differentiating networks. Whenever a generally square wave of voltage is applied to these networks, they normally develop two short pulses corresponding to the leading and lagging edges of the square wave. These pulses are of opposite polarity and the polarity of the pulse corresponding to leading edge of the square wave is determined by the polarity of the control waveform applied to the network. The appearance of a positive pulse on either one of grids 83 or 85 has substantially no effect on the conduction through electron discharge device 76 since these grids are already connected to a very high positive potential. However, when sufficiently negative potentials or pulses appear on these grids, the conduction through electron discharge device 76 is considerably reduced, thereby causing the appearance of a pulse or rise in potential in the plate circuit of electron discharge device 76.

Electron discharge device 76 has the characteristic that it conducts only when suitable positive potentials are applied to its control grids, that is, each grid has absolute control over the conduction through the tube and only when the potentials at both grids are of proper magnitude is there conduction. Accordingly, since the control pulses which are applied to the respective grids 83 and 85 of electron discharge device 76 are of opposite polarities, it is readily apparent that when these pulses are applied to the grids through the differentiating networks that only the negative pulses, one negative pulse corresponding to the leading edge of the control pulses and the other negative pulse corresponding to the lagging edge of the control pulses, appears in the plate circuit of electron discharge device 76.

The output from the electron discharge device 76 which is a positive pulse corresponding to the leading edge of the key control pulse 79 or 80 and another positive pulse corresponding to the trailing edge of the key control pulse 79 or 80 may be coupled to a grid 88a of an amplifier 77 through coupling capacitor 89. The pulses represented by the graph 78 are coupled from the cathode circuit of electron discharge device 77 through coupling capacitor 90 to terminal 91 and then may be applied to a camera viewfinder for developing therein an indication of the particular portion of each line of the second video scene that is being used in the photo montage. The control pulses produce a pair of dots corresponding to the beginning and end of each video line of the second scene which is utilized in the photo montage. The composite effect produced is a line which may be either light or dark which encloses the portion of the second scene which is being used in the photo montage.

Special "wipe" dissolve effects in addition to the montage effect may also be produced by the apparatus of Fig. 1. Instead of utilizing the second video signal to obtain a control signal, an independent control signal of either line or field periodicity may be applied to amplifier 16 through switch 77. The nature of control signal applied at terminal 76 determines the nature of the "wipe" dissolve effect produced by the apparatus. For example, by the application of a series of symmetrical sawtooth waves of successively increasing amplitude and of a period corresponding to line frequency a "wipe" effect in which a scene corresponding to the second video is unfolded by cutting the scene corresponding to the first video signal vertically through the center and then progressively sliding the respective halves of the first picture to their respective sides out of view. By the application of other suitable waveforms, other more complicated wiping effects may be produced.

Referring now to Figs. 3*a* and 3*b*, there are shown two scenes of the kind adapted to be televised. A portion of the scene of Fig. 3*b* is black as indicated by shaded lines. By combining the video signals obtained from scanning the scene of Fig. 3*a* and the scene of Fig. 3*b* by means of the apparatus of my invention, the video signal is adapted to produce a combination scene shown in Fig. 3*c*.

Referring now to Fig. 4, there is shown another embodiment of my invention. The system of Fig. 4 is similar to the system of Fig. 1 except as to the manner of developing control pulses for alternately keying the keyed amplifiers of the first and second video channels. The keyed amplifiers and the key control amplifiers of the present embodiment are identical with key control amplifiers 20 and the keyed amplifiers 12 and 15 of Fig. 2, respectively.

The control pulses of either line periodicity or frame periodicity and of controllable width are applied to the key control amplifier 20 through the cathode follower stage 92. These control pulses are developed by electron discharge device 93. Electron discharge device 93 is preferably a type 6BN6 electron discharge device having a cathode 94, an anode 95 and two control electrodes 96 and 97. Each of the control electrodes 96 and 97 have independent control over the conduction through the electron discharge device. Electron discharge device 93 has the further characteristic that once conduction is established by the application of suitable potentials to the grids 96 and 97, a small additional potential completely saturates the device.

The cathode 94 of device 93 is connected to point 117 on voltage divider 118 connected between B+ and ground. A by-pass capacitor 119 is connected between point 117 and ground. Grid 96 is connected to the movable contactor of switch 100. One pole 120 of the switch 100 is connected to point 121 of voltage divider network 118 which is positive with respect to point 117. Screen electrode 122 is connected to point 123 of divider 118 which is positive with respect to point 121. Grid 97 is connected to the movable contactor of switch 98. One pole 124 of switch 98 is connected to point 121 of divider 118. A by-pass capacitor 125 is connected between point 121 and ground.

A source 99 of sawtooth waves synchronized by the horizontal synchronizing signal and having one output terminal connected to ground and the other output terminal connected to one electrode of capacitor 102*a*. The other electrode of capacitor 102*a* is connected through resistance 106 to pole 125 of switch 98. The junction of capacitor 102*a* and resistance 106 is connected through resistance 102 to a B− point. This junction is also connected to the cathode of a unilaterally conducting device, the anode of which is connected to movable contactor of voltage divider 104 which is connected between the B+ and B− points of the power supply.

A source 108 of sawtooth waves synchronized by the vertical synchronizing signal and having one output terminal connected through capacitor 126 to grid 109 of cathode follower stage 107. The grid 109 is also connected to the cathode of unilaterally conducting device 127, the anode of which is connected to the movable contactor 114 of voltage divider 111 which is connected across the power supply.

The anode of stage 107 is connected to B+. The cathode of stage 107 is connected through a resistance 128 to ground. The cathode is connected also through resistance 129 to pole 130 of switch 100.

For one mode of operation of the circuit of Fig. 4, switch 100 is "down" thereby putting a fixed positive potential on grid 96, and switch 98 is "up" permitting sawtooth waves from generator 99 to be applied to the grid 97. The sawtooth waves from generator 99 charge capacitor 102*a* through unilaterally conducting device 103. The time constant of capacitor 102*a* and resistance 102 is made relatively long in comparison to the duration of time between successive peaks of the sawtooth wave. Accordingly, capacitor 102*a* retains its charge and the cathode of device 103 becomes positively biased, the amount of bias depending on the amplitude of the sawtooth wave and the position of the movable contactor 105 on divider 104. Thus, the voltage applied to grid 97 consists of a unidirectional component and a sawtooth component, the former component can be varied by varying movable contactor 105, thereby causing device 93 to conduct during variable portions of the sawtooth cycle. In this way the control pulses developed at the anode 95 of device 93 can be manually varied from zero to one hundred percent width. The application of these control pulses through cathode follower stage 92 and amplifiers 20 to keyed amplifiers 12 and 15 causes these latter amplifiers to conduct alternately during each video line. Accordingly, by varying the duration of conduction of the amplifiers a horizontal wipe dissolve effect can be produced.

With switch 98 "down" and switch 100 "up," control pulses having a vertical frame frequency repetition rate are produced at the anode of electron discharge device 93. The arrangement is operable to produce vertical wipe dissolve effects in a manner similar to the manner in which horizontal wipe effects are produced as pointed out above. The bias level at the grid 109 of the cathode follower stage is suitably controlled by potentiometer 111. By manually varying the position of arm 114 on the potentiometer 111, the potential at the grid 109 of the cathode follower 92 and consequently at the grid 96 of electron discharge device 93 can be varied manually to vary the point in the sawtooth wave cycle at which the electron discharge device 93 conducts. Accordingly, by manually moving the arm 114 of the potentiometer 111, the essentially square wave output obtained at the plate 95 of electron discharge device 93, may be varied from substantially zero duration to substantially one hundred percent duration to thereby control the amplifiers 20, 12 and 15 to produce vertical wipe dissolve effects.

When both switches 98 and 100 are in their "up" positions, control pulses are produced at the anode of electron discharge device 93 which are a combination of horizontal and vertical rate control pulses. By simultaneous movement of the arms 105 and 114 of potentiometers 104 and 111, respectively, a wedge wipe of one picture into the other is produced in a manner illustrated in Fig. 5. By a wedge wipe is meant a wipe dissolve effect in which the wiping contour is wedge shaped.

A wedge wipe dissolve effect is produced by the simultaneous movement of arms 105 and 114 because of the complete control of the plate current of discharge device 93 which is maintained by each of the grids 96 and 97. If grid 96 is below the conduction potential no plate current will flow regardless of the potential on grid 97. Likewise if grid 97 is below the conduction potential no plate current will flow regardless of the potential on grid 96. Plate current in discharge device 93 flows only when the instantaneous potential on both grid 96 and grid 97 is above the critical conduction potential. This action is illustrated in Fig. 5 where the picture as it would be seen on a television viewing screen is shown marked off in quadrants. Those quadrants where either one of the two control grids is off will have picture A and only that quadrant where both control grids are on will have picture B. By varying the coincidence time of the voltages applied to the grids 96 and 97, the relative portions of picture A and B in the combination picture can be varied.

If on the other hand the horizontal and vertical sawtooth voltages were mixed and applied to one of the control grids of discharge device 93 while the other grid had a suitable bias voltage applied, variation of the D.-C. component of the mixed signal would act to produce a diagonal wiping action. Many other wiping arrangements resulting from mixing of signals on one grid or from simultaneous application of signals of other waveform to both grids will occur to those versed in the art.

When the controls of potentiometers 104 and 111 are so set that there is no conduction in electron discharge device 93, the subsequent stages which are coupled to the plate 95 of the electron discharge device 93 tend to drift and produce various undesirable picture effects in the output utilization circuits. Accordingly, when the wipe controls 105 and 114 are completely off, the synchronizing signal is applied to the grid 115 of the cathode follower stage 92 to insure that there always is an A.-C. signal applied to the key control amplifiers 20 which control the keyed amplifiers 12 and 15. The synchronizing signal is applied to grid 115 through amplifier 116. The synchronizing signal does not interfere with the normal operation of the circuits of Fig. 4 or the appearance of the picture on a television screen since the synchronizing signal is applied during the blanking interval of the television signal.

While I have shown a particular embodiment of my invention, it will of course be understood that I do not wish to be limited thereto since many modifications, both in the circuit arrangement and in the instrumentalities employed, may be made, and I therefore contemplate by the appended claims to cover any such modifications which fall within the true spirit and scope of my invention.

What I claim as new and desire to secure by Letters Patent of the United States is:

1. In a television system signal transfer means comprising a first electron discharge device having an input circuit and an output circuit, a second electron discharge device having an input circuit and an output circuit, common utilization means connected to the output circuits of said electron discharge devices, means for supplying a first video signal to said first input circuit, means for supplying a second video signal to said second input circuit, control means including a third electron discharge device having a cathode, an anode and two control grids, each of said control grids independently capable of controlling current flow through said third electron discharge device, means for supplying a periodic signal of horizontal line frequency to one of said grids, means for supplying a periodic signal of frame repetition frequency to the other of said grids, means for independently and variably biasing the grids of said third electron discharge device whereby said electron discharge device can be made to conduct on various portions of the periodic signals applied to said grids, said electron discharge device having the characteristic that once conduction is established little additional control voltage applied to either grid is sufficient to saturate said third electron discharge device, means for coupling pulses from the anode of said third electron discharge device, control means for developing control pulses from said pulses adapted to alternately key said first and second electron discharge devices, an anode load connected to the anode of said third electron discharge device, means for coupling a synchronizing signal to the anode of said third electron discharge device whereby an alternating control potential is always applied to said control means to maintain said first and second electron discharge devices functioning even though the bias settings on the grids of said third electron discharge device are such that no control pulses are being developed.

2. Television apparatus comprising a first electron discharge device having a cathode, a grid and an anode, a second electron discharge device having a cathode, a grid and an anode, said anodes connected together and adapted to feed a common load, means for applying a first video signal to the grid of said first electron discharge device, means for applying a second video signal including a prominent portion to the grid of said second electron discharge device, means for supplying periodic control pulses of one polarity to said first electron discharge device to control the conduction of said first electron discharge device and means for supplying identical control pulses but of reverse polarity to said second electron discharge device to control the conduction thereof whereby said electron discharge devices are rendered alternately conductive, said pulses being derived from the prominent portion of said second video signal, means for developing indicating pulses of short duration and of the same polarity corresponding to the leading and lagging edges of said control pulses including an electron discharge device having a cathode, an anode and two control grids each capable of independently controlling the conduction through said electron discharge device, said electron discharge device further having the characteristic that once conduction starts due to the application of a control potential to one of said control grids a small additional control potential causes complete conduction in said electron discharge device, means for differentiating each of said control pulses and applying one of said differentiated signals to one of said grids and the other of said differentiated signals to the other of said grids, said grids each being conductively connected through said differentiating means to a source of positive potential, a load impedance having one end connected to the anode of said electron discharge device and the other end to a source of positive potential, means for coupling short pulses from the anode of said electron discharge device corresponding to the leading and lagging edges of said control pulses, means for applying said short pulses to means adapted to monitor the picture corresponding to said second video signal whereby an indication is produced in said picture indicating the particular portion of said picture being used to displace a porton of the picture corresponding to said first video signal.

3. The combination, in a television system in which a plurality of images to be televised are scanned line by line and field by field, and in which said images are synchronously with said scanning reproduced line by line and field by field, of a common transmission channel, individual channels connected to said common transmission channel and each carrying signals varying in accord with the respective images to said common channel, means for rendering said individual channels alternately operative to pass said signals in response to control pulses applied thereto, an electron discharge device having a cathode, an anode and two control grids, each of said control grids independently capable of controlling current flow through said electron discharge device, means for supplying a periodic signal synchronized with said line by line scanning to one of said grids, means for supplying a second periodic signal synchronized with said field by fiield scanning to the second of said grids, means for independently and variably biasing the grids of said electron discharge device to vary the conduction of said electron discharge device over a variable part of said line by line period and said field by field period to produce pulses of current in said device of variable duration and synchronized with said scanning periodicity, means for applying said pulses to said first means, whereby the relative portions of said plurality of images in said image reproduced from signals in said common channel may be varied by varying said biases.

4. The combination, in a television system in which a pair of images to be televised are scanned line by line and field by field, and in which said images are synchronously with said scanning reproduced line by line and field by field, of a common transmission channel, a pair of individual channels connected to said common channel and each carrying signals varying in accord with respective images to said common channel, means for deriving from the signal in one of said individual channels when said signal exceeds a predetermined amplitude control pulses each of which has a duration dependent on the time said signal exceeds said amplitude, means responsive to said control pulses for rendering said individual channels alternately operative to pass signals to said common channel, said one individual channel being rendered operative and said other individual channel being rendered inoperative during the occurrence of said control pulses, means for developing pairs of indicating pulses which are of short duration and of like polarity, each of the pulses of said pairs corresponding to respective edges of said control pulses, a cathode ray indicator, means for applying said indicating pulses and the signal carried by said one channel to said indicator, whereby an indication is produced on said indicator in which there is delineated that portion of the image in said one channel used to control the transmission of signals to said common channel.

5. The combination, in a television system in which a pair of images to be televised are scanned line by line and field by field, and in which said images are synchronously with said scanning reproduced line by line and field by field, of a common transmission channel, a pair of individual channels connected to said common channel and each carrying signals varying in accord with the respective images to said common channel, means for deriving from the signal in one of said individual channels when said signal exceeds a predetermined amplitude control pulses each of which has a duration dependent upon the time said signal exceeds said amplitude, means responsive to said control pulses for rendering said individual channels alternately operative to pass signals to said common channel, said one individual channel being rendered operative and said other individual channel being rendered inoperative during the occurrence of said control pulses, means for developing pairs of indicating pulses which are of short duration and of like polarity, each of the pulses of said pairs corresponding to respective edges of said control pulses, a cathode ray indicator, means for applying said indicating pulses and the signal carried by said other channel to said indicator, whereby an indication is produced on said indicator in which there is delineated that portion of the image in said other channel which is deleted in transmission to said common channel.

References Cited in the file of this patent

UNITED STATES PATENTS

| | | |
|---|---|---|
| 2,073,370 | Goldsmith et al. | Mar. 9, 1937 |
| 2,113,473 | Batchelor | Apr. 5, 1938 |
| 2,164,297 | Bedford | June 27, 1939 |
| 2,172,936 | Goldsmith | Sept. 12, 1939 |
| 2,240,420 | Schnitzer | Apr. 29, 1941 |
| 2,244,239 | Blumlein et al. | June 3, 1941 |
| 2,393,645 | Maki | Jan. 29, 1946 |
| 2,490,561 | Ussler | Dec. 6, 1949 |
| 2,495,826 | Schock | Jan. 13, 1950 |